(12) United States Patent
Benzie (10) Patent No.: US 10,832,455 B2
(45) Date of Patent: Nov. 10, 2020

(54) SYSTEM AND METHOD FOR LOCATING UNDERGROUND LINES USING A VIEW-IN-THE-GROUND INDICATOR

(71) Applicant: METROTECH CORPORATION, Santa Clara, CA (US)

(72) Inventor: Stephen Andrew Benzie, Radstock (GB)

(73) Assignee: METROTECH CORPORATION, Santa Clara, CA (US)

(*) Notice: Subject to any disclaimer, the term of this patent is extended or adjusted under 35 U.S.C. 154(b) by 367 days.

(21) Appl. No.: 15/191,320

(22) Filed: Jun. 23, 2016

(65) Prior Publication Data

US 2016/0379390 A1 Dec. 29, 2016

Related U.S. Application Data

(60) Provisional application No. 62/185,467, filed on Jun. 26, 2015.

(51) Int. Cl.
*G01V 3/15* (2006.01)
*G06T 11/20* (2006.01)

(52) U.S. Cl.
CPC .............. *G06T 11/206* (2013.01); *G01V 3/15* (2013.01)

(58) Field of Classification Search
CPC ........ G06T 11/206; G06T 11/001; G01S 7/03; G01S 13/88; G01V 3/15; G01V 3/08; G01V 3/081; G06F 3/016; G06F 3/0346
See application file for complete search history.

(56) References Cited

U.S. PATENT DOCUMENTS

| 7,741,848 B1* | 6/2010 | Olsson .................... G01V 3/15 |
| | | 324/326 |
| 2005/0156600 A1* | 7/2005 | Olsson .................... G01S 7/03 |
| | | 324/329 |

(Continued)

FOREIGN PATENT DOCUMENTS

WO 2014040079 A1 3/2014

OTHER PUBLICATIONS

International Search Report for PCT Application No. PCT/US2016/039445 issued by the US Searching Authority dated Sep. 9, 2016; pp. 1-2.

(Continued)

*Primary Examiner* — Douglas X Rodriguez
*Assistant Examiner* — Brent J Andrews
(74) *Attorney, Agent, or Firm* — Haynes and Boone, LLP (57) ABSTRACT

A system and method of for underground line location using a view-in-the-ground indicator includes a display. The display includes a view-in-the-ground indicator configured to indicate left-right position information and orientation information associated with a plurality of underground lines using a corresponding plurality of needles. The plurality of needles are concurrently displayed and are distinguishable from one another. Each of the plurality of needles has a variable horizontal position that indicates the left-right position information and a variable orientation that indicates the orientation information. In some embodiments, the plurality of needles are distinguishable from one another based on a color coding scheme. In some embodiments, the color coding scheme of the plurality of needles matches a color coding scheme of a plurality of feeder cables coupled to the plurality of underground lines.

12 Claims, 7 Drawing Sheets

(56) References Cited

U.S. PATENT DOCUMENTS

| | | |
|---|---|---|
| 2005/0259930 A1 | 11/2005 | Elkins et al. |
| 2006/0036376 A1 | 2/2006 | Gudmundsson et al. |
| 2006/0055584 A1 | 3/2006 | Waite et al. |
| 2008/0042652 A1 | 2/2008 | Brune et al. |
| 2010/0085376 A1 | 4/2010 | Nielsen et al. |
| 2016/0003961 A1 | 1/2016 | Olsson et al. |

OTHER PUBLICATIONS

Written Opinion of the International Searching Authority for PCT Application No. PCT/US2016/039445 issued by the US Searching Authority dated Sep. 9, 2016; pp. 1-6.
Extended European Search Report from European Patent Application No. 16815466.4 dated May 15, 2019.

* cited by examiner

SYSTEM AND METHOD FOR LOCATING UNDERGROUND LINES USING A VIEW-IN-THE-GROUND INDICATOR

RELATED APPLICATION

The present application claims the priority to U.S. Provisional Patent Application No. 62/185,467 filed Jun. 26, 2015, the entire contents of each being incorporated herein by reference.

TECHNICAL FIELD

The present disclosure relates generally to underground line location and more particularly to underground line location using a view-in-the-ground indicator.

BACKGROUND

An underground line locator, such as a utility line locator, is a portable, manually moveable instrument used to detect signals generated by underground lines, such as utility pipes, cables, and/or the like. The signals generated by the underground lines may include, for example, alternating magnetic fields produced by alternating currents transmitted through buried conductive lines. Based on the detected signals, underground line locators are used to determine the location of underground lines that would otherwise be difficult to locate. The ability to accurately locate underground lines is highly desirable in many applications. For example, inadvertently digging into an electrical and/or gas line may result in injury, fires, toxic emissions, damage to the digging equipment, damage to the utility line, and/or the like. Furthermore, the ability to accurately locate underground lines provides greater knowledge about the layout of a site. For example, detailed knowledge about the location of underground lines at a given site may be helpful when planning construction and/or repair projects at the site.

Accordingly, it would be desirable to provide systems and methods for improved underground line locators.

SUMMARY

A display for an underground line locator may include a view-in-the-ground indicator configured to indicate left-right position information and orientation information associated with a plurality of underground lines using a corresponding plurality of needles, the plurality of needles being concurrently displayed and being distinguishable from one another. Each of the plurality of needles has a variable horizontal position that indicates the left-right position information and a variable orientation that indicates the orientation information.

A method for providing feedback to a user of an underground line locator may include determining signal strength information corresponding to a first underground line, displaying the signal strength information using a signal strength indicator, determining left-right positioning and orientation information corresponding to the first underground line, and displaying the left-right positioning and orientation information associated with the first underground line using a view-in-the-ground indicator.

An underground line locator system may include one or more transmitters configured to couple a plurality of locate tones onto a corresponding plurality of underground lines, a locator configured to measure the time-varying magnetic fields and determine signal strength, position, and orientation information associated with the plurality of underground lines based on time-varying magnetic fields, and a display interface coupled to the locator configured to display the signal strength, position, and orientation information. Each of the plurality of locate tones are distinguishable from one another. The plurality of locate tones cause the plurality of underground lines to radiate the time-varying magnetic fields. The signal strength information is displayed using a bar graph indicator. The position and orientation information is displayed using a view-in-the-ground indicator.

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
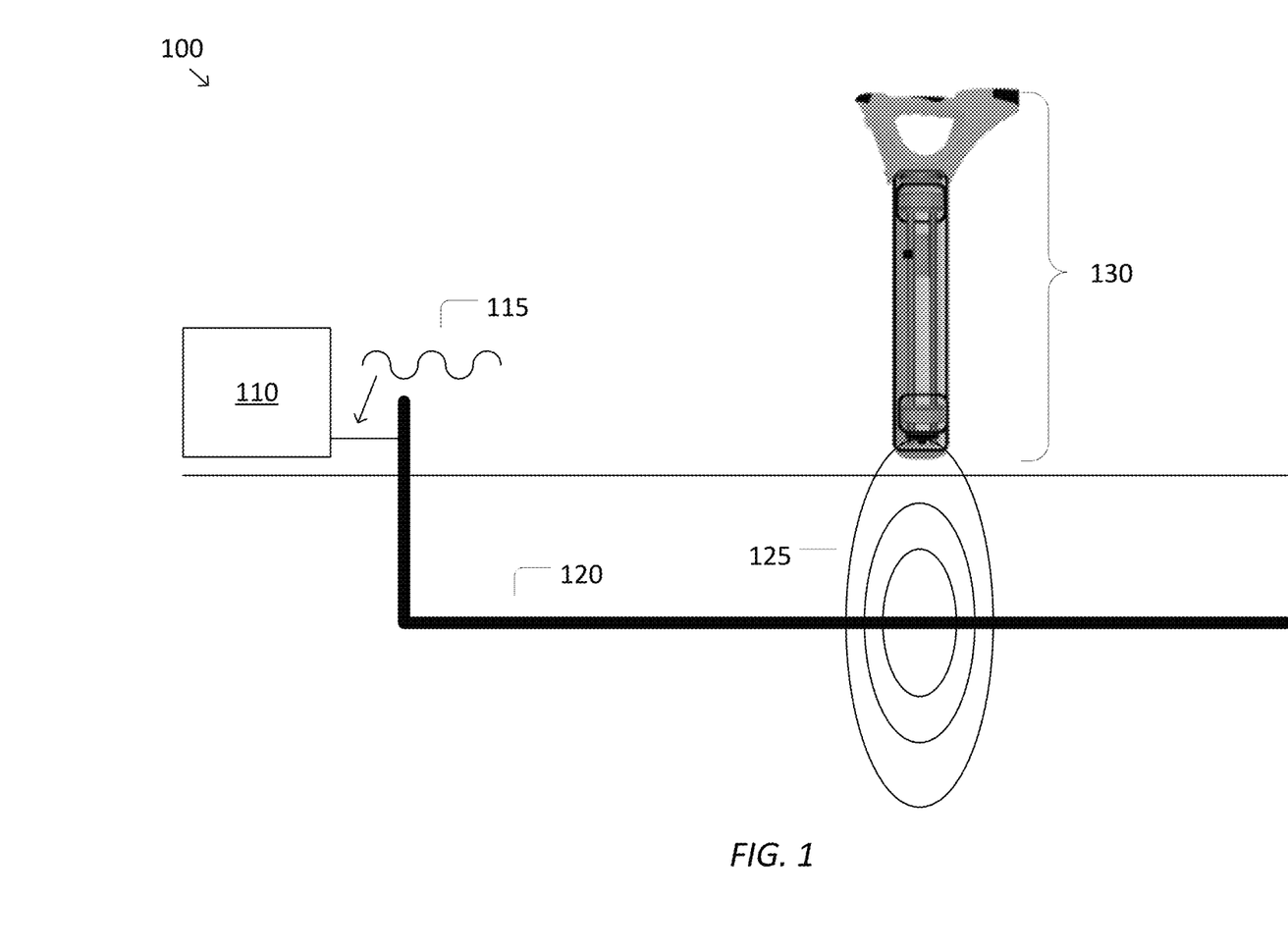
FIG. 1 is a simplified diagram of an underground line locator system according to some embodiments.

FIG. 1 is a simplified diagram of an underground line locator system 100 according to some embodiments. A transmitter 110 couples a locate tone 115 onto one or more underground lines 120. Transmitter 110 may include a signal generator implemented using portable components, components that are fixed to underground line 120, and/or a combination of fixed and portable components. Locate tone 115 may include an alternating current (AC) electrical signal that is generated by transmitter 110 and transmitted through underground line 120. Locate tone 115 may include any suitable time-varying signal, such as an AC waveform at a predetermined frequency, a pulse sequence, a modulated AC waveform carrying information based on its time-varying frequency, amplitude, and/or phase, and/or the like. In some examples, locate tone 115 may be decomposed into in-phase and quadrature components based on a reference phase. Underground line 120 is electrically conductive such that locate tone 115 is transmitted through underground line 120.

When locate tone 115 is transmitted through underground line 120, a time-varying magnetic field 125 is generated around underground line 120 via electromagnetic induction. Magnetic field 125 radiates outward from underground line 120. A locator 130 is used to detect magnetic field 125 and/or characteristics of magnetic field 125, such as its strength, gradient, and/or direction. Locator 130 may further detect information embedded in a time-varying signal carried by magnetic field 125. Based on the detected characteristics of magnetic field 125, locator 130 determines the location and/or identity of underground line 120.

Locator 130 may be a portable underground line locator operated by a user. In some examples, the user may manually move locator 130 around a survey area and record the location of at least a portion of underground line 120 as determined by locator 130. In some examples, the user may swing locator 130 back and forth while moving around the survey area. In some examples, the user may not swing locator 130 back and forth, but instead may maintain locator 130 at a constant position relative to the user as the user moves around the survey area. According to some examples, locator 130 may provide feedback to the user regarding underground line 120 by any suitable mechanism, such as audio, visual, and/or haptic feedback. According to some embodiments, locator 130 may provide visual feedback to the user through a display interface that may convey information in various formats including text, numbers, colors, bar graphs, arrows, meters, needles, maps and/or the like. The information conveyed through the display is responsive to changes in the detected characteristics of magnetic field 125. According to some embodiments, locator 130 may be designed to improve upon conventional utility line locators by providing a more intuitive and/or extensible display interface.

Figure 2:
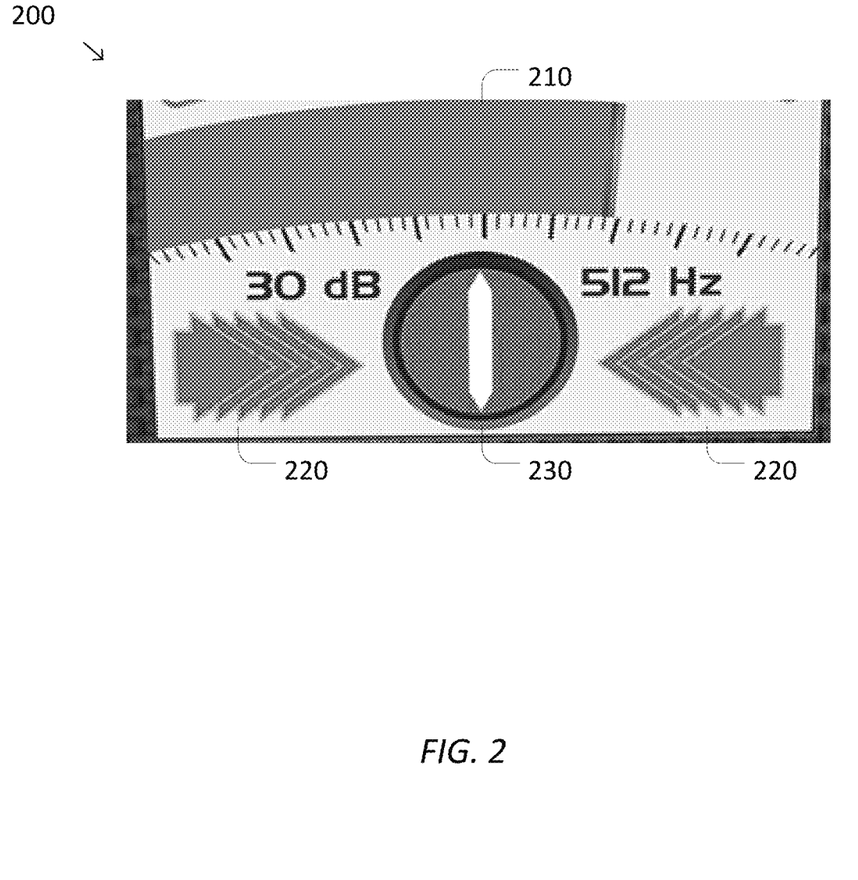
FIG. 2 is a simplified diagram of a display interface for an underground line locator.

FIG. 2 is a simplified diagram of a display interface 200 for an underground line locator. Some utility line locators may provide feedback to a user through a display interface similar to display interface 200. Display interface 200 includes a set of indicators 210-230 that assist the user in searching for, orienting, and/or centering the locator over a utility line. Bar graph 210 indicates signal strength, where signal strength depends upon the proximity of the locator to an underground line. Accordingly, a user may seek to move the locator based on the feedback provided by bar graph 210 in order to maximize the displayed signal strength. Left-right arrows 220 indicate whether the user is located to the left or right of the utility line to assist the user in centering the utility line locator over the utility line. Compass line direction indicator 230 indicates the orientation of the utility line relative to the locator to assist the user in identifying the direction in which the utility line runs.

Figure 3:
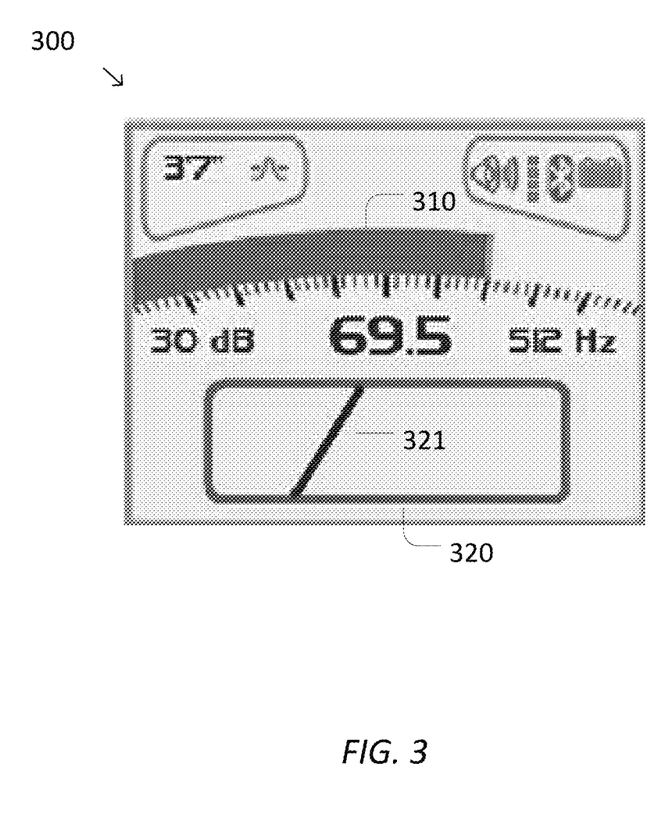
FIG. 3 is a simplified diagram of a display interface with a view-in-the-ground indicator for an underground line locator according to some embodiments.

FIG. 3 is a simplified diagram of a display interface 300 with a view-in-the-ground indicator for an underground line locator according to some embodiments. According to some embodiments consistent with FIG. 1, locator 130 may provide feedback to a user through a display interface similar to display interface 300. Display interface 300 includes a set of indicators 310 and 320 that assist the user in searching for, orienting, and/or centering locator 130 over underground line 120. Like bar graph 210 of display interface 200, bar graph 310 indicates signal strength, where signal strength depends upon the proximity of locator 130 to underground line 120. However, rather than having separate indicators 210 and 220 to indicate the left-right positioning and orientation of the utility line, respectively, display interface 300 includes a view-in-the-ground indicator 320 that indicates combined information associated with left-right positioning and orientation of underground line 120 relative to locator 130. In particular, view-in-the-ground indicator 320 includes a needle 321 that moves from left to right (i.e., has a variable horizontal position) to indicate the left-right positioning of underground line 120 relative to locator 130. Needle 321 also rotates (i.e., has a variable orientation) to indicate the orientation of underground line 120 relative to locator 130. One advantage of combining left-right positioning and orientation information into a single view-in-the-ground indicator 320 while concurrently displaying bar graph 310 is increased intuitiveness to the user. A further advantage is the ability to concurrently display information about multiple utility lines, as will be discussed below.

Figure 4:
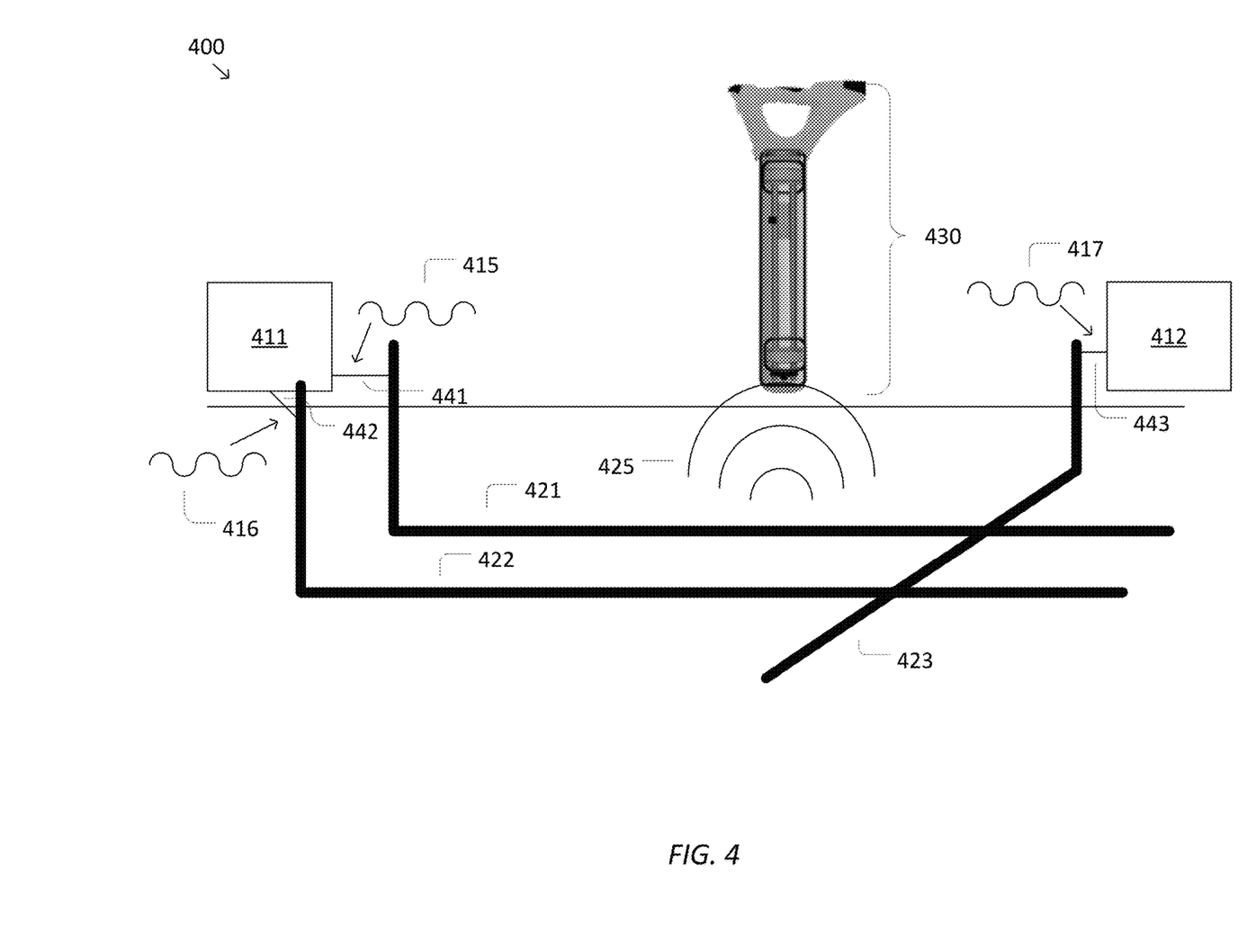
FIG. 4 is a simplified diagram of an underground line locator system with multiple underground lines according to some embodiments.

FIG. 4 is a simplified diagram of an underground line locator system 400 with multiple underground lines according to some embodiments. One or more transmitters 411 and 412 couple a plurality of locate tones 415-417 onto a corresponding plurality of underground lines 421-423. A time-varying magnetic field 425 is generated around underground lines 421-423 via electromagnetic induction in response to application of locate tones 415-417 to underground lines 421-423. A locator 430 is used to detect magnetic field 425 and/or characteristics of magnetic field 425. In general, these components correspond to similar components described previously with respect to FIG. 1. Each of locate tones 415-417 are distinct from one another so as to be distinguishable by locator 430 (i.e., locator 430 is able to decompose magnetic field 425 into a plurality of distinct signals associated with each of underground lines 421-423). For example, each of locate tones 415-417 may have a different frequency, modulation pattern, and/or the like. In some examples, underground lines 421-423 may be coupled to transmitters 411 and/or 412 using feeder cables 441-443. According to some embodiments, feeder cables 411-443 may be color coded to label the pairings between locate tones 415-417 and underground lines 421-423. According to some embodiments, locator 430 may be designed to concurrently provide feedback to the user based on the detected signal from more than one of underground lines 421-423 at a given time.

Figure 5:
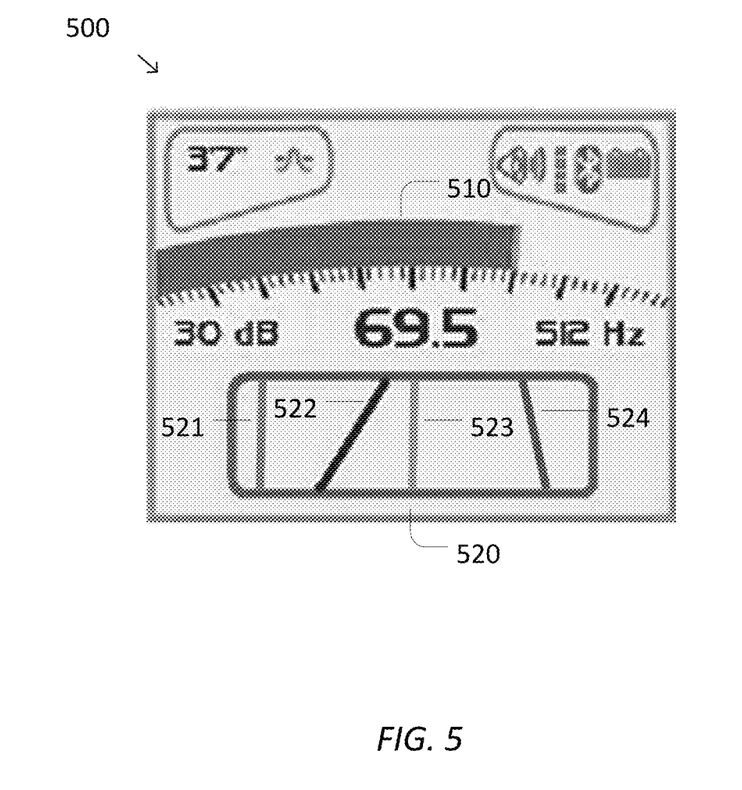
FIG. 5 is a simplified diagram of a display interface for an underground line locator with a view-in-the-ground indicator having multiple needles according to some embodiments.

FIG. 5 is a simplified diagram of a display interface 500 for an underground line locator with a view-in-the-ground indicator having multiple needles according to some embodiments. According to some embodiments consistent with FIG. 4, locator 430 may provide feedback to a user through a display interface similar to display interface 500.

Like display interface 300, display interface 500 includes a set of indicators 510 and 520 that assist the user in searching for, orienting, and/or centering locator 430 over a plurality of utility lines. Bar graph 510 indicates signal strength and may be set to indicate signal strength from one of the underground lines being detected. According to some embodiments, display interface 500 may include a plurality of bar graphs similar to bar graph 510, each bar graph corresponding to a different underground line.

View-in-the-ground indicator 520 indicates information associated with left-right positioning and orientation of the underground lines. View-in-the-ground indicator 520 includes a plurality of needles 521-524, each needle being associated with a different underground line. Each of needles 521-524 moves from left to right (i.e., has a variable horizontal position) to indicate the left-right positioning of the corresponding underground line relative to locator 430. Similarly, each of needles 521-524 rotates (i.e., has a variable orientation) to indicate the orientation of the corresponding underground line relative to locator 430.

Needles 521-524 may be distinguished from one another so the user is able to tell them apart by a suitable identifier, such as color coding, patterning, line style coding (e.g., solid, dashed, dotted, bold, and/or the like), labelling, flashing patterns, and/or the like. According to some examples, the color coding of needles 521-524 may match the color coding scheme of feeder cables 441-443. Similarly, bar graph 510 may be colored using a matching color coding scheme so that it is apparent which of the underground lines is being depicted in bar graph 510. When display interface 500 includes a plurality of bar graphs, each bar graph may be colored according to the color coding scheme.

One challenge of displaying multiple needles in display interface 500 is to facilitate user interpretation as the displayed information changes. For example, when the user swings locator 430 back and forth over a plurality of utility lines, the multiple needles in display interface 500 may change too quickly for the user to accurately interpret and respond to the rapidly-changing information. Accordingly, in some examples display interface 500 may be used in a mode where the user does not swing locator 130 back and forth but rather maintains locator 130 at a fixed location relative to the user. In furtherance of such embodiments, the user may walk around a survey area without swinging locator 130 back and forth such that the information displayed in display interface 500 changes sufficiently slowly to facilitate user interpretation.

Figure 6:
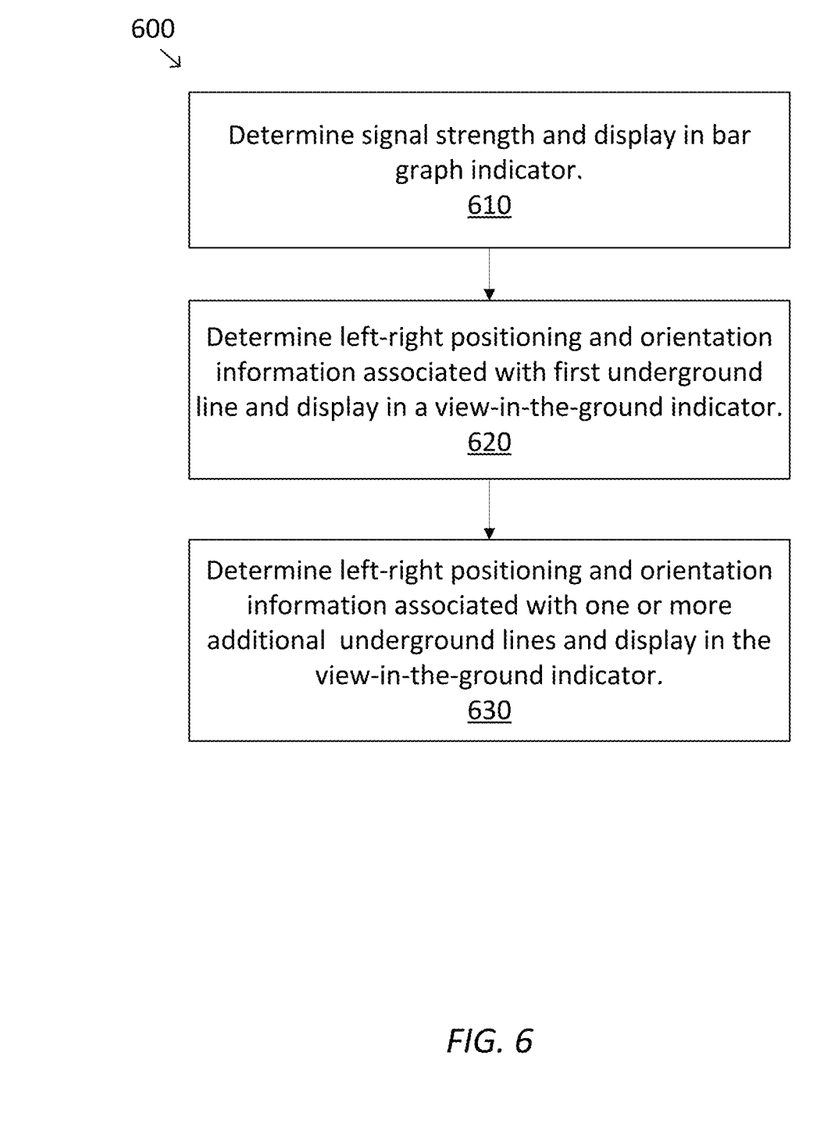
FIG. 6 is a simplified diagram of a method of underground line location using a view-in-the-ground display according to some embodiments.

FIG. 6 is a simplified diagram of a method 600 of underground line location using a view-in-the-ground display according to some embodiments. According to some embodiments, method 600 may be performed by an underground line locator, such as locator 130 and/or 430. Method 600 may be used to assist a user in locating one or more underground lines in a survey area.

In some examples, method 600 may be performed in response to the underground line locator detecting one or more signals (e.g., a time-varying magnetic field) corresponding to the one or more underground lines. In some examples, the underground line locator may decompose the detected signal into components (e.g., based on the frequencies of the locate tones) to distinguish between the underground lines. In some examples, the underground line locator may determine various properties of each component of the detected signal, such as the signal strength, left-right positioning, orientation, and/or the like.

At a process 610, a signal strength is determined and displayed in a bar graph indicator. In some embodiments, the signal strength displayed in the bar graph indicator corresponds to a selected one of the underground lines. In some embodiments, the selected one of the underground lines may be dynamically selectable and/or user selectable. According to some examples, the bar graph indicator may be an instance of bar graph 310 and/or 510. In some examples, the signal strength may be proportional to the strength of a time-varying magnetic field detected by the underground line locator, where the time-varying magnetic field is generated by the underground line in response to a locate tone. In some examples, another type of signal strength indicator may be used to display signal strength in addition to and/or instead of a bar graph indictor, such as a strength meter (e.g., a rotating needle), alphanumeric text, and/or the like.

At a process 620, left-right positioning and orientation information associated with a first underground line is determined and displayed in a view-in-the-ground indicator. According to some examples, the view-in-the-ground indicator may be an instance of view-in-the-ground indicator 320 and/or 520. The left-right positioning and orientation information may be displayed by setting the horizontal position and orientation of a first needle within the view-in-the-ground indicator.

At a process 630, left-right positioning and orientation information associated with one or more additional underground lines is determined and displayed in the view-in-the-ground indicator. According to some embodiments, the left-right positioning and orientation information may be displayed by setting the horizontal position and orientation of one or more additional needles within the view-in-the-ground indicator, each of the first and additional needles being distinguishable from one another (e.g., color coded, patterned, labeled, and/or the like). According to some embodiments, processes 620 and 630 may be performed concurrently such that the view-in-the-ground indicator concurrently displays information associated with more than one underground line. Furthermore, process 610 may be performed concurrently with processes 620 and/or 630 such that signal strength information is displayed concurrently with view-in-the-ground information.

Figure 7:
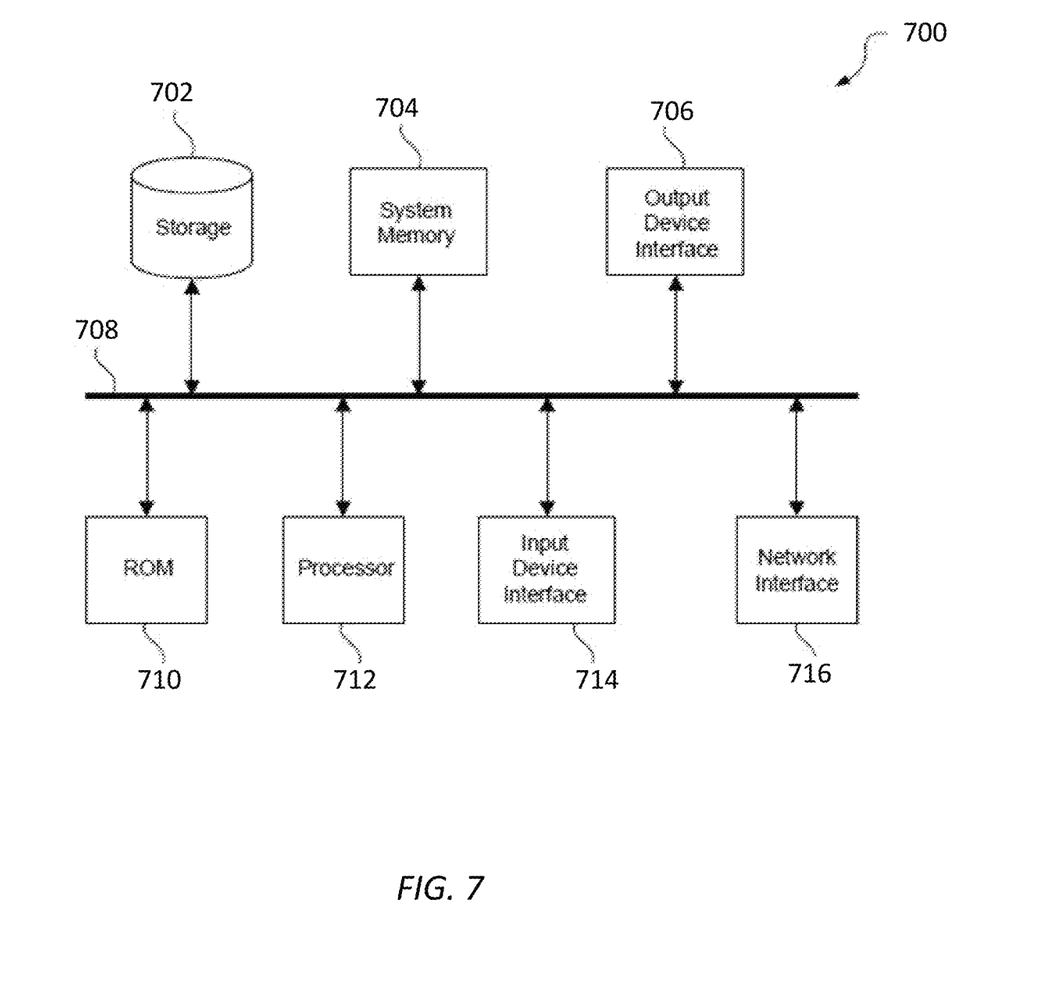
FIG. 7 is a simplified diagram of a computer system in which embodiments of the present disclosure may be implemented.

FIG. 7 is a simplified diagram of a computer system 700 in which embodiments of the present disclosure may be implemented. Computer system 700 may be adapted for performing underground line location using a view-in-the-ground indicator. For example, the steps of the operations of method 600 of FIG. 6 may be implemented using system 700. System 700 can be a computer, phone, personal digital assistant (PDA), or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for performing underground line detection and display on a view-in-the-ground indicator in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to system 700. Input devices used with input device interface 814 include, for example, alphanumeric, QWERTY, or T9 keyboards, microphones, and pointing devices (also called "cursor control devices"). Output device interfaces 706 enables, for example, the display of images generated by system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network (LAN), such as an Intranet, a wireless network, and/or a wide area network (WAN), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of the operations of method 600 of FIG. 6, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wireless network, and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Thus, an underground line locator using a view-in-the-ground indicator has been described. Embodiments of an underground line locator using a view-in-the-ground indicator include a display for an underground line locator. The display includes a view-in-the-ground indicator configured to indicate left-right position information and orientation information associated with a plurality of underground lines using a corresponding plurality of needles, the plurality of needles being concurrently displayed and being distinguishable from one another. Each of the plurality of needles has a variable horizontal position that indicates the left-right position information and a variable orientation that indicates the orientation information. Likewise, an underground line locator system has been described and may generally include one or more transmitters configured to couple a plurality of locate tones onto a corresponding plurality of underground lines, a locator configured to measure the time-varying magnetic fields and determine signal strength, position, and orientation information associated with the plurality of underground lines based on time-varying magnetic fields, and a display interface coupled to the locator configured to display the signal strength, position, and orientation information. Each of the plurality of locate tones are distinguishable from one another. The plurality of locate tones cause the plurality of underground lines to radiate the time-varying magnetic fields. The signal strength information is displayed using a bar graph indicator. The position and orientation information is displayed using a view-in-the-ground indicator.

For any of the foregoing embodiments the system may include any one of the following elements, alone or in combination with each other: a bar graph indicator configured to indicate signal strength information corresponding to a selected one of the plurality of underground lines and further configured to indicate which of the plurality of underground lines is currently selected; the selected one of the plurality of underground lines is user selectable; a plurality of bar graph indicators configured to indicate signal strength information corresponding to the plurality of underground lines, the plurality of bar graph indicators being concurrently displayed and being distinguishable from one another; the plurality of needles are distinguishable from one another based on a color coding scheme; the color coding scheme of the plurality of needles matches a color coding scheme of a plurality of feeder cables coupled to the plurality of underground lines; a bar graph indicator configured to indicate signal strength information corresponding to a selected one of the plurality of underground lines and further colored according to the color coding scheme to indicate which of the plurality of underground lines is currently selected; the plurality of locate tones are distinguishable from one another based on frequency and/or modulation; the one or more transmitters are coupled to the plurality of underground lines via a plurality of feeder cables, the plurality of feeder cables being distinguishable from one another based on a color coding scheme; the bar graph indicator and the view-in-the-ground indicator of the display interface are colored according to the color coding scheme of the feeder cables; and the view-in-the-ground indicator includes a plurality of needles corresponding to the plurality of underground lines, and wherein each of the plurality of needles has a variable horizontal position that indicates the position information and a variable orientation that indicates the orientation information.

A method for providing feedback to a user of an underground line locator has been described. Embodiments of the method may include determining signal strength information corresponding to a first underground line, displaying the signal strength information using a signal strength indicator, determining left-right positioning and orientation information corresponding to the first underground line, and displaying the left-right positioning and orientation information associated with the first underground line using a view-in-the-ground indicator.

For the foregoing embodiments, the method may include any one of the following steps, alone or in combination with each other: determining left-right positioning and orientation information associated with one or more additional underground lines; displaying the left-right positioning and orientation information associated with the one or more additional underground lines using the view-in-the-ground indicator; determining signal strength information corresponding to the one or more additional underground lines; switchably displaying the signal strength information corresponding to the one or more additional underground lines using the signal strength indicator, wherein the signal strength indicator displays signal strength information corresponding to one selected underground line at a time; the view-in-the-ground indicator uses a color coding scheme to distinguish among the first underground line and the one or more additional underground lines; the signal strength indicator is colored according to the color coding scheme to indicate that the signal strength information corresponding to the first underground line is being displayed; and displaying the signal strength information corresponding to the one or more additional underground lines using one or more additional signal strength indicators, wherein the signal strength indicator and the one or more additional signal strength indicators are colored according to the color coding scheme.

What is claimed is:

1. A method of providing feedback to a user of an underground line locator comprising:

determining signal strength information corresponding to each of a plurality of underground lines simultaneously, each of the plurality of underground lines coupled to a tone of a plurality of distinct locate tones;

displaying the signal strength information of at least one of the plurality of underground lines using a signal strength indicator;

determining a left-right positioning and orientation information corresponding to each of the plurality of underground lines;

displaying the left-right positioning and orientation information associated with the plurality of the underground lines using a view-in-the-ground indicator that simultaneously shows a needle extending across the view-in-the-ground indicator for each of the plurality of underground lines, each needle rotating to indicate orientation and shifting to indicate left-right positioning of a corresponding one of the plurality of underground lines, each needle designated with a specific characteristic associated with the corresponding one of the plurality of underground lines to distinguish each needle from the other displayed needles, wherein the specific characteristic of each needle indicates the tone coupled to the corresponding one of the plurality of underground lines.

2. The method of claim 1, further comprising:

determining left-right positioning and orientation information associated with one or more additional underground lines; and displaying the left-right positioning and orientation information associated with a one or more additional underground lines using the view-in-the-ground indicator.

3. The method of claim 2, further comprising:

determining signal strength information corresponding to the one or more additional underground lines; and switchably displaying the signal strength information corresponding to the one or more additional underground lines using the signal strength indicator, wherein the signal strength indicator displays signal strength information corresponding to one selected underground line at a time.

4. The method of claim 2, wherein the special characteristic is color and wherein the signal strength indicator is colored to indicate the corresponding to the at least one of the plurality of underground lines.

5. The method of claim 4, wherein the signal strength indicator is colored according to the color coding scheme to indicate that the signal strength information corresponding to each of the polarity of underground lines is being displayed.

6. The method of claim 4, further comprising:

determining signal strength information corresponding to the one or more additional underground lines; and displaying the signal strength information corresponding to the one or more additional underground lines using one or more additional signal strength indicators, wherein the signal strength indicator and the one or more additional signal strength indicators are colored according to the color coding scheme.

7. The method of claim 1, wherein the underground line locator is maintained in a fixed position relative to the user such that the left-right positioning and the orientation information changes slowly in comparison to when the underground line locator is swinging relative to the user.

8. An underground line locator system comprising:

one or more transmitters configured to couple a plurality of locate tones onto a corresponding plurality of underground lines, each of the plurality of locate tones being distinguishable from one another, wherein the plurality of locate tones cause a plurality of underground lines to radiate time-varying magnetic fields, each of the plurality of underground lines radiating a time-varying magnetic field at the corresponding tone;

a locator configured to measure the time-varying magnetic fields and determine signal strength, position, and orientation information associated with the plurality of underground lines based on the corresponding tone of the time-varying magnetic fields;

a display interface coupled to the locator configured to display the signal strength, position, and orientation information of a plurality of underground lines, wherein:

a signal strength information of each of the plurality of underground lines is displayed using a bar graph indicator; and the position and orientation information of the plurality of underground lines is displayed using a view-in-the-ground indicator that shows a needle extending across the view-in-the-ground indicator for each of the plurality of underground lines, each needle rotating and shifting to indicate orientation and left-right positioning of a corresponding one of the plurality of underground lines, each needle designated with a specific characteristic associated with the corresponding one of the plurality of underground lines to distinguish each needle from the other displayed needles, wherein the specific characteristic of each needle indicates the tone coupled to the corresponding one of the plurality of underground lines.

9. The underground line locator system of claim 8, wherein the plurality of locate tones are distinguishable from one another based on frequency, modulation, or both.

10. The underground line locator system of claim 8, wherein the one or more transmitters are coupled to the plurality of underground lines via a plurality of feeder cables, the plurality of feeder cables being distinguishable from one another based on a color coding scheme.

11. The underground line locator system of claim 10, wherein the bar graph indicator and the view-in-the-ground indicator of the display interface are colored according to the color coding scheme of the feeder cables.

12. The underground line locator system of claim 8, wherein the view-in-the-ground indicator includes a plurality of needles corresponding to the plurality of underground lines, and wherein each of the plurality of needles has a variable horizontal position that indicates a position information and a variable orientation that indicates the orientation information.

* * * * *